United States Patent [19]

LeBegue

[11] Patent Number: 5,295,733
[45] Date of Patent: Mar. 22, 1994

[54] FIBER OPTIC REMOTE CONTROL SYSTEM FOR A CONTINUOUS MINER AND METHOD OF USE

[75] Inventor: Maurice K. LeBegue, Fairmont, W. Va.

[73] Assignee: Tamrock World Corporation, N.V., Curacao, Netherlands Antilles

[21] Appl. No.: 918,419

[22] Filed: Jul. 22, 1992

Related U.S. Application Data

[63] Continuation-in-part of Ser. No. 693,682, Apr. 30, 1991, abandoned.

[51] Int. Cl.⁵ ............ E21C 35/24; B65H 23/16; G02B 6/44
[52] U.S. Cl. .................. 299/30; 226/191; 226/198; 254/414; 385/100; 385/111
[58] Field of Search ............. 299/1.4, 30; 385/100, 385/109, 111; 242/47.07; 226/190, 191, 196, 198, 199; 254/414

[56] References Cited

U.S. PATENT DOCUMENTS

| | | | |
|---|---|---|---|
| 1,384,153 | 7/1921 | Roos | 242/47.5 |
| 1,940,701 | 12/1933 | Shope | 242/47.5 |
| 1,940,702 | 12/1933 | Shope | 242/47.5 |
| 2,034,267 | 3/1936 | Nydegger | 226/191 X |
| 4,174,816 | 11/1979 | Olson | 242/47.5 |
| 4,468,088 | 8/1984 | van der Hoek | 385/111 |
| 4,756,510 | 7/1988 | Klamm et al. | 254/134.4 |
| 4,759,602 | 7/1988 | Pascher | 385/111 |
| 4,850,536 | 7/1989 | Teranishi et al. | 239/332 |
| 4,884,847 | 12/1989 | Bessinger et al. | 299/1.4 |
| 5,110,189 | 5/1992 | Haines | 299/30 |
| 5,117,859 | 6/1992 | Carlson | 137/355.25 |
| 5,186,406 | 2/1993 | Romanelli | 242/54 R |

FOREIGN PATENT DOCUMENTS

| | | | |
|---|---|---|---|
| 538927 | 4/1957 | Canada. | |
| 2720159 | 12/1978 | Fed. Rep. of Germany. | |
| 720638 | 9/1952 | United Kingdom. | |
| 1554951 | 10/1979 | United Kingdom. | |
| 1565275 | 4/1980 | United Kingdom. | |
| 2152476 | 8/1985 | United Kingdom | 242/47.5 |
| 2205916 | 12/1988 | United Kingdom. | |

*Primary Examiner*—David J. Bagnell
*Attorney, Agent, or Firm*—Stanley J. Price, Jr.

[57] ABSTRACT

A mining machine is controlled by a fiber optic controlled remote control system that includes one or more fiber optic cables that extend from a remote control station through a hose supplying water to the mining machine. The fiber optic cables exit the water hose for connection to electrically operated equipment onboard the mining machine. Connectors having sealing glands with apertures therethrough allow for insertion of the cables into the water hose and exiting of the cables from the hose at the mining machine while preventing the escape of water from the hose at the points of insertion and exiting. The fiber optic cable is supported and positioned for movement in the hose to relieve tension on the cable when the hose is stretched.

25 Claims, 4 Drawing Sheets

FIBER OPTIC REMOTE CONTROL SYSTEM FOR A CONTINUOUS MINER AND METHOD OF USE

CROSS REFERENCE TO RELATED APPLICATION

This application is a continuation-in-part of co-pending application Ser. No. 693,682 filed Apr. 30, 1991 entitled "Fiber Optic Remote Control System On A Continuous Miner With Fiber Optic Cable Extending Into A Water Hose" now abandoned.

BACKGROUND OF THE INVENTION

1. Field of the Invention

This invention relates to a combination fiber optic raceway and water hose for use in remote control of an underground mining machine.

2. Description of the Prior Art

Remote control systems for use in underground mining machines have developed in recent years to better ensure safety of operating personnel by permitting operation of mining machines at a point remote from the mine face where unsupported roof and ribs can be an immediate hazard. Similarly, redundant remote control systems are being utilized to provide backup in the event of a failure of the primary remote control system. The backup or secondary remote control system gives some assurance that personnel will not be exposed to danger present at the face in order to manually recover the miner or repair the primary remote control system. On such fiber optic redundant remote control system is disclosed in U.S. Pat. No. 5,110,189.

It is also known to practitioners in the art to include the remote control cable, typically carrying a low energy electrical signal, within the three-phase power trailing cable electrical supply source to the miner. U.S. Pat. No. 4,884,847 discloses the use of a fiber optic cable for transmitting communication signals from a remote location to a mining machine.

Since the electrical signals have previously been the practically exclusive method for providing remote control through the trailing cable, it has been impracticable to place the control cable within the water supply hose. The proximity to water and its inherent conductive electrical properties would invite unreasonable risks of fault currents and system failures. However, with the advent of fiber optic technology these risks are eliminated.

Most, if not all, mining machines are provided with water supply means when mining coal, for dust control, fire suppression and other reasons. A flexible water hose is used to connect the fixed pipe water supply to the continuous miner water distribution system. Normally, means is provided to protect the water supply hose from being broken, as when the moving treads run over the hose. In practice it is more frequently encountered that the mining machine will run over its power trailing cable than it will pierce its water supply hose.

Fiber optic cable technology is not readily adaptable to field splicing in the environment of coal mines. A relatively clean and dry area which is well illuminated is required to align the fine fibers and join them using an epoxy. While it is known to remotely control the operation of electrical equipment in an underground mine by a fiber optic control system, the known devices expose the fiber optic cable to damage and interruption of the transmitted communication signal.

Also, measures must be taken to protect the integrity of the fiber optic cable and not subject it to undue stress as encountered when tension is applied to the cable, as occurs when it is stretched. To allow for efficient conveyance of the cable to the power equipment and permit the cable to move with the power equipment, the cable must be supplied from a source, as from a spooling device or the like. Known spooling devices for cables are well known as disclosed in the following U.S. Pat. Nos. 1,384,153; 1,940,701; 1,904,702; 4,174,816 and 5,117,859 as well as U.K. Patent No. 2,152,476, Canadian Patent No. 538,927 and German Patent No. 2720159. However, with a fiber optic cable reeling and unreeling the cable from a rotating spool exposes the internal optic fibers to damaging stresses. Therefore, there is need to provide method and apparatus for efficiently protecting the fiber optic cable from damage.

SUMMARY OF THE INVENTION

In accordance with the present invention there is provided apparatus for transmitting optical communication signals to electrically powered equipment used in an underground mine that includes at least one optical communication cable having a first end portion, a second end portion and an intermediate portion between the first and second end portions. The cable first end portion is positioned remotely from the powered equipment for receiving optical communication signals. The cable second end portion is positioned to supply the optical communication signals onboard the powered equipment. A flexible hose conveys a fluid from a source to the powered equipment. The cable extends at preselected length through the hose with fluid flowing through the hose surrounding the cable. The cable enters the hose at a point adjacent the first end portion and exits the hose at a point adjacent the second end portion with the intermediate portion positioned within the hose. The cable intermediate portion has means for permitting the cable to extend in length and move within the hose in response to stretching of the flexible hose in the transmission of optical communication signals through the cable positioned within the hose supplying a fluid to the powered equipment.

Further in accordance with the present invention, there is provided a mining machine that includes a mobile frame and means connected to the mobile frame for dislodging mine material. Conveying means moves the dislodged mine material rearwardly of the mining machine. A water hose supplies the mining machine with water. An operating station is located remote of the mobile frame. A fiber optical control system is positioned at the operating station. A fiber optical cable transmits optical communication signals from the control system onboard the mining machine. The fiber optic cable has a first end portion connected to the control system and a second end portion positioned onboard the mining machine. The fiber optic cable extends through the water hose between the first and second end portions. Reel means stores a preselected length of the fiber optic cable adjacent to the cable first end portion to permit feeding of an additional length of the fiber optic cable into the water hose to relieve tension exerted on the fiber optic cable when the water hose is stretched.

Additionally, the present invention is directed to a method for transmitting optical communication signals to a mining machine that includes the steps of supplying water to the mining machine through a hose from a source positioned remote from the mining machine. Optical communication signals are generated from a station located remote from the location of operation of the mining machine. The optical communication signals are transmitted through a fiber optic cable extending from the station to the mining machine. The fiber optic cable is inserted into the water hose adjacent to the station. The fiber optic cable extends a preselected distance through the water hose. The fiber optic cable exits from the water hose for connection to the mining machine. The fiber optical cable is supported for movement within the hose to relieve tension exerted on the fiber optic cable when the water hose is stretched.

A cable spooling device includes a stationary frame and a plurality of elongated rollers positioned in spaced relation in a circular array adjacent to the frame. The rollers have surfaces for supporting a length of cable looped between ends of the cable around the rollers in a circular path. The rollers each have an axial shaft extending from the end portions of the rollers. Slot means in the frame receive the end portions of the shafts of the rollers. The slot means extend in a radial direction on the frame. Biasing means supported by the frame in alignment with the slot means and connected to the roller shafts respectively normally urge the roller shafts in the slots to an outer radial position on the frame to position the rollers to support the cable looped in an expanded circular path around the rollers. The biasing means respond to an increase in tension exerted on the cable and move radially inwardly to move the roller shafts in the slots to an inner radial position on the frame to position the rollers to support the cable looped in a retracted circular path around the rollers so that a length of cable is fed from the circular path to decrease the tension in the cable.

Accordingly, a principal object of the present invention is to provide a remote control system for operating a mining machine that includes a fiber optic cable extending through a flexible hose which is also used to deliver water to the mining machine.

A further object of the present invention is to reduce the likelihood of rupturing or otherwise damaging a fiber optic cable used in a remote control system for electrically operated equipment in an underground mine by running the cable through a water line that supplies water to the equipment.

A further object of the present invention is to provide method and apparatus for supporting and extending a fiber optic cable through a flexible hose where the fiber optic cable is movable within the hose to prevent excessive tension exerted on the fiber optic cable when the hose is stretched.

Another object of the present invention is to provide a spooling device for supporting a looped portion of a cable to allow extension of the cable in response to an increase in tension exerted on the cable.

These and other objects of the invention will be more completely disclosed and described in the following specification, accompanying drawings and appended claims.

DESCRIPTION OF THE PREFERRED EMBODIMENTS

Figures 1, 2, 2A, 3:
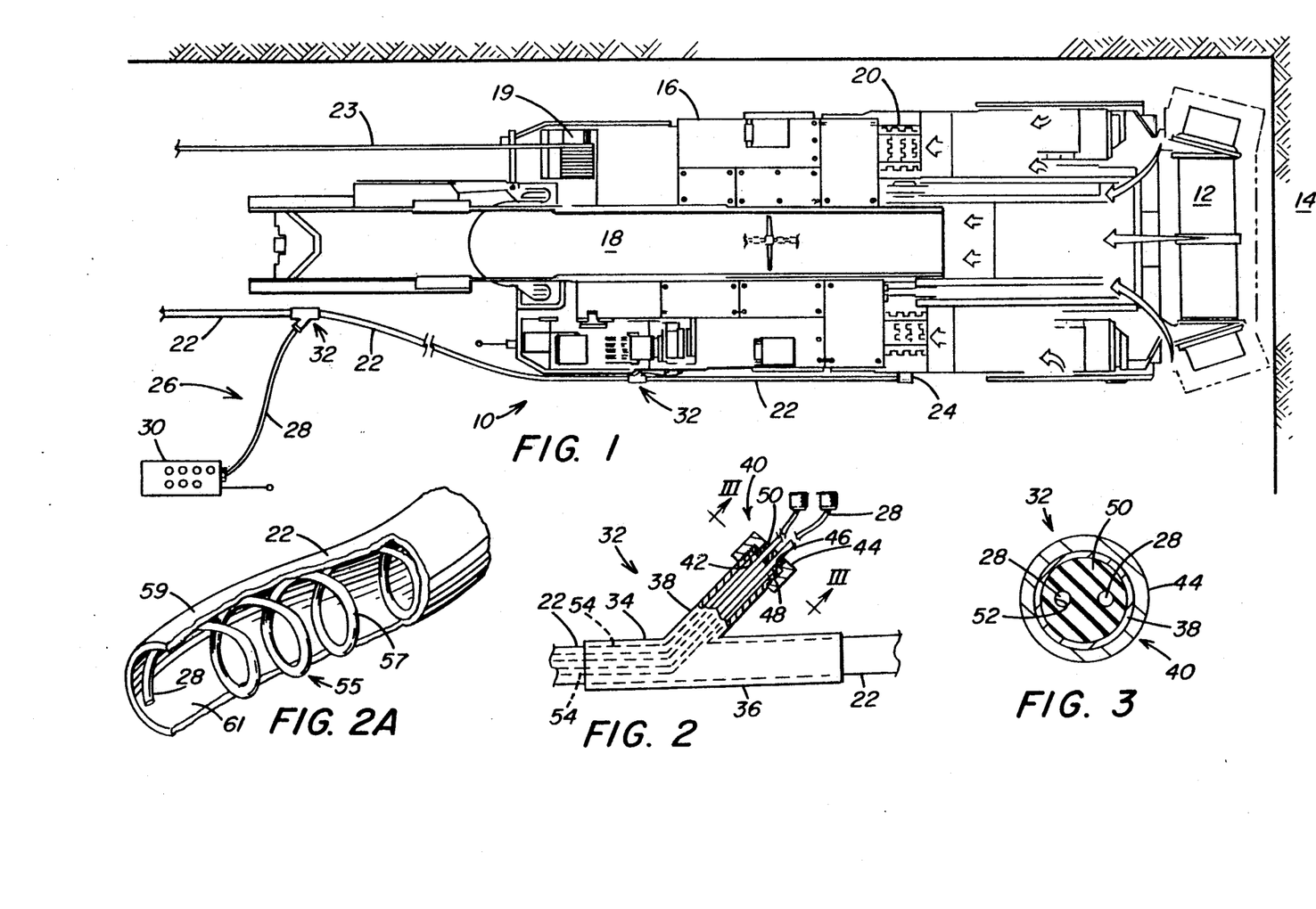
FIG. 1 is a top plan view of a continuous mining machine located adjacent to a mine face, illustrating a remotely positioned control station having a fiber optic communication cable extending into a water supply hose associated with the mining machine.
FIG. 2 is a sectional view in side elevation of a cable insertion device for extension of fiber optic communication cables through the water supply hose, illustrating a sealing gland and gland retainer for sealing around the cable port.
FIG. 2A is a fragmentary isometric view of the fiber optic communication cable positioned in the water supply hose, illustrating a portion of the cable wound in a spiral configuration to permit movement of the cable within the hose when the hose is stretched.
FIG. 3 is a cross sectional view along line III—III in FIG. 2, illustrating axial penetration of a pair of fiber optic communication cables through the sealing gland in the cable insertion device.

Referring to the drawings, and particularly to FIG. 1, there is illustrated a mining machine generally designated by the numeral 10 for use in underground mining operations. The mining machine 10 has a material dislodging means 12 to dislodge material from a mine face 14. The machine 10 also includes a frame 16, a conveying means 18 and a propulsion means 20. A water hose 22 extends from a water source (not shown). Water under pressure is propelled through the hose 22 to a water inlet connector 24 onboard the mining machine 10. The water is supplied to the mining machine 10 through hose 22 for a number of uses, for example, in driving a cutter drum, dust control, fire suppression and other uses on the mining machine 10 where water is used as a propellant or to perform work on the mining machine, as known in the art.

In accordance with the present invention as shown in FIG. 1, a fiber optic remote control system generally designated by the numeral 26 includes one or more fiber optic communication cables 28 that extend from a fiber optic transmitter 30 located at a portable remote control station through the water hose 22 to the mining machine 10. Thus, the water hose 22 serves as a raceway for the fiber optic cable 28. The fiber optic remote control system 26 is used as a backup for a primary radio control system, shown in FIG. 4, for the remote operation of the mining machine 10. This system is disclosed and described in U.S. Pat. No. 5,110,189 which is incorporated herein by reference and will be described later in greater detail.

One or more of the fiber optic communication cables 28 enter the water hose 22 through a y-shaped cable insertion fitting or device 32. From the insertion device 32, the cable 28 extends through the water hose 22 to another cable insertion device 32 where the cable 28 connects to a suitable receiver unit on the mining machine 10 for receipt of the light impulses sent through the cable 28 from the fiber optic transmitter at control station 30. The insertion device 32 may also be used to connect individual sections of the water hose 22.

Figure 6:
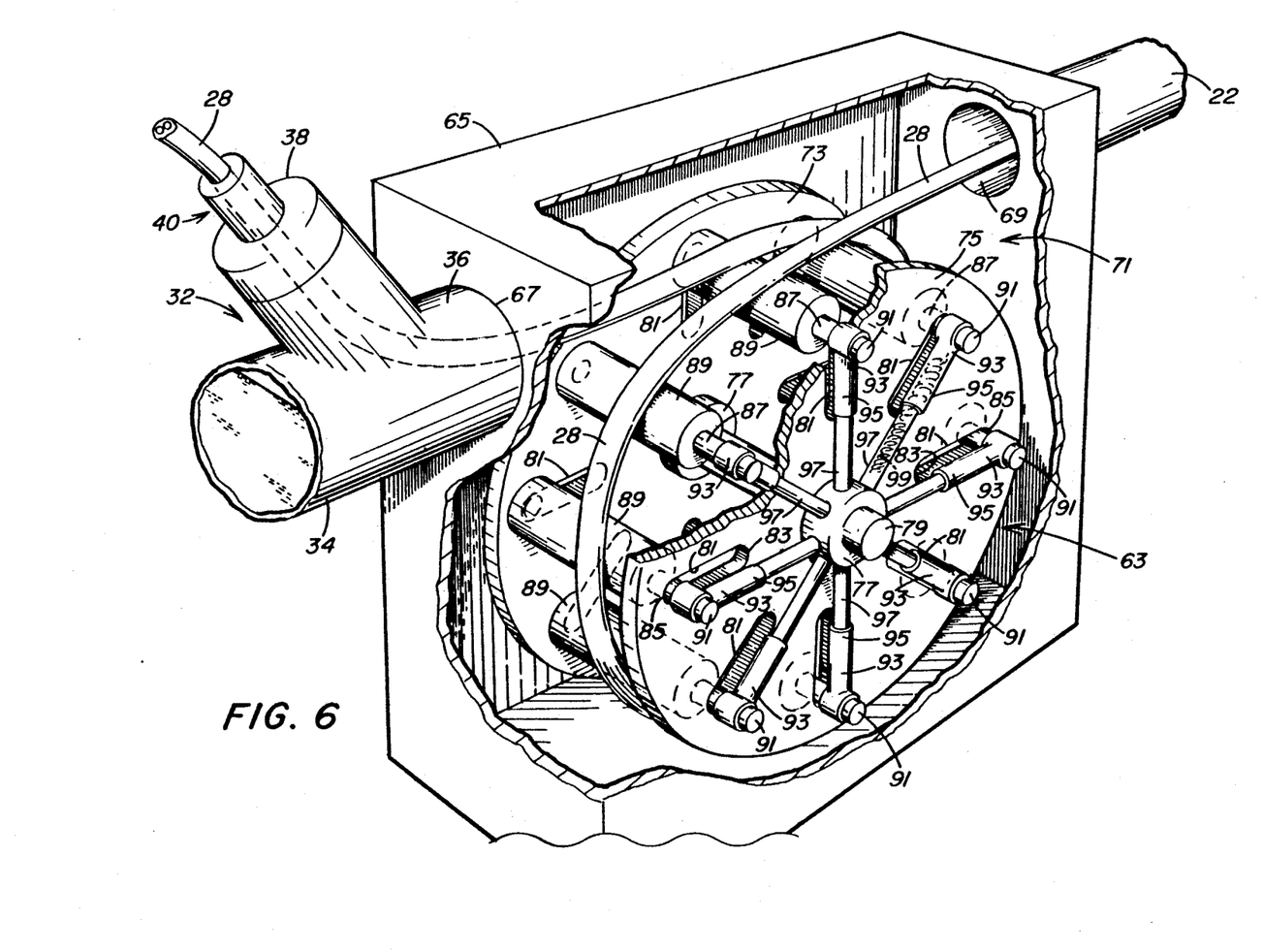
FIG. 6 is a fragmentary isometric view of a cable spooling device for supporting the fiber optic cable under a preselected tension within the water supply hose.
Figure 7:
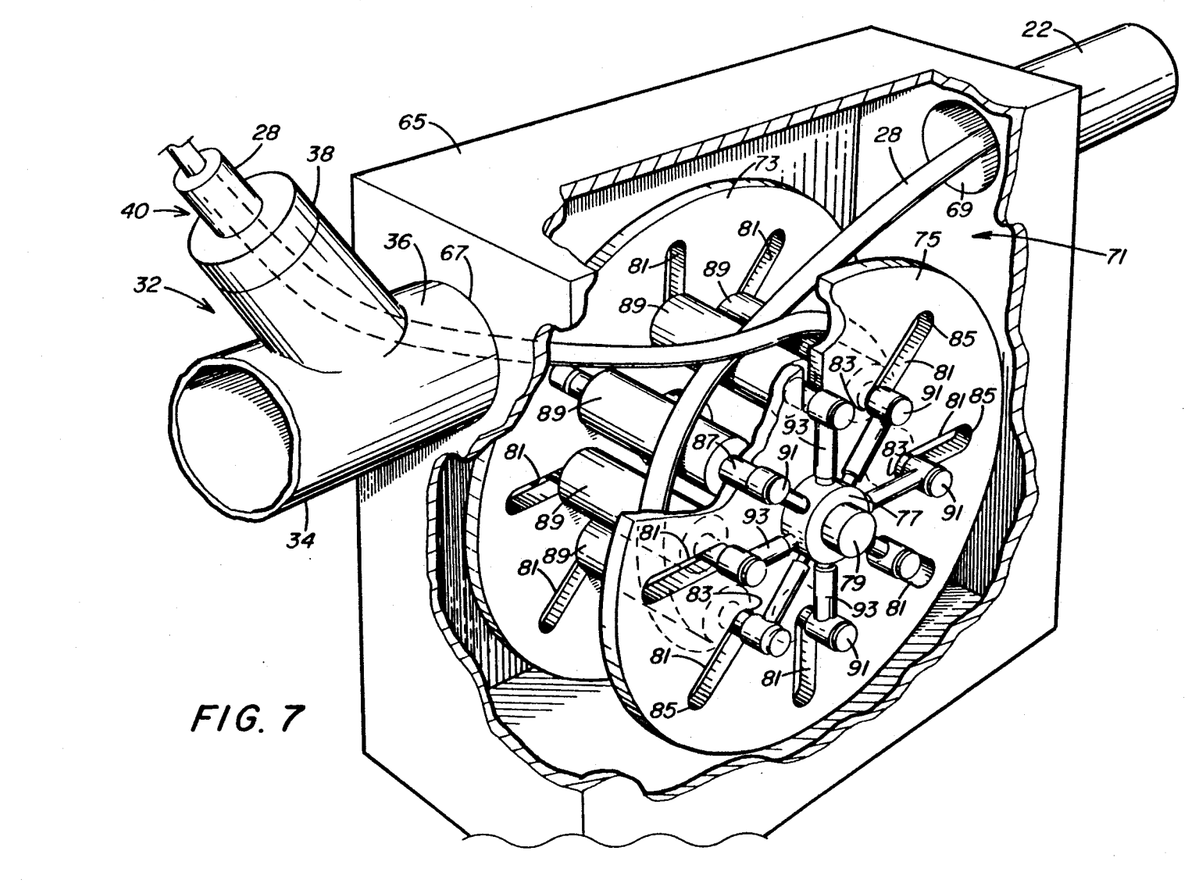
FIG. 7 is a view similar to FIG. 6 for supporting the cable in response to an increase in tension exerted on the cable.

Between the points where the fiber optic cable 28 enters and exits the water hose 22, the cable 28 is supported for movement within the hose 22 in response to stretching of the water hose 22. The cable 28 is permitted to move so that when the hose 22 is stretched and the tension in the cable 28 is increased, the movement of the cable 28 in the hose 22 relieves the cable tension so as not to exceed a preselected tension on the cable 28. FIGS. 2A, 6 and 7 illustrate apparatus for permitting movement of the cable 28 within the hose 22 and will be described later in greater detail.

Figure 5:
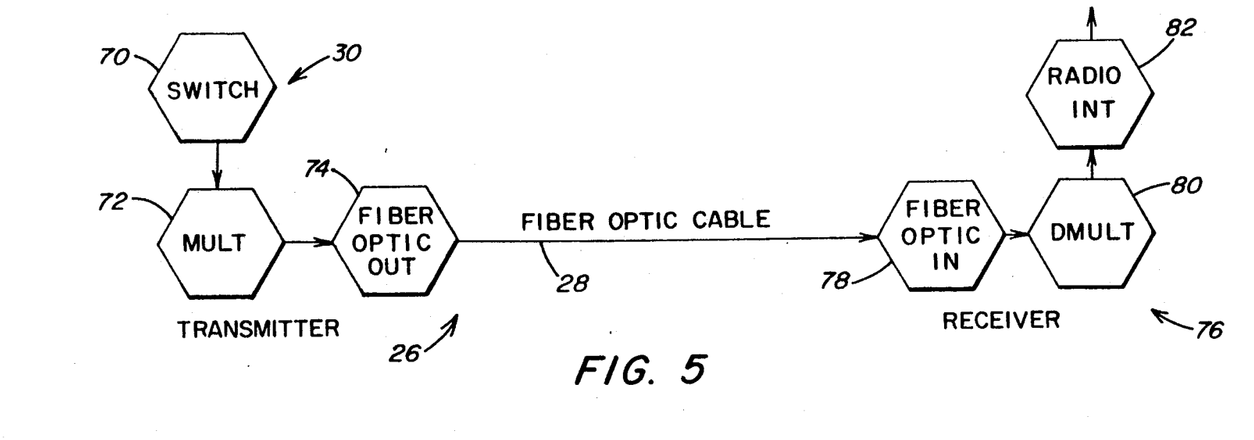
FIG. 5 is a schematic view similar to FIG. 4, illustrating a fiber optic system for backup use with the radio remote control system.

As shown in FIG. 2, cable insertion fitting 32 has a water leg 34 for connection to water hose 22, a merge leg 36 for connection to another section of hose 22, and a cable leg 38 for receiving fiber optic communication cables 28. A pair of communication cables 28 is shown in FIG. 5. A gland retainer generally designated by the numeral 40 has a threaded, axially extending bore 42 and an end wall 44 with an aperture 46. Cable leg 38 has an externally threaded portion 48 for attachment to gland retainer 40.

A gland 50 is fabricated of flexible, resilient material and is compressed between end wall 44 of the gland retainer 40 and the cable leg 38 in the threaded bore 42 of gland retainer 40. As gland retainer 40 is screw tightened upon cable leg 38, gland 50 is compressed between end wall 44 and the end of cable leg 38 to form a watertight seal therebetween. The cables 2 extend through orifices 52 in the gland 50.

FIG. 3 illustrates the cable insertion device 32 in cross section through cable leg 38 and the manner in which gland 50 sealingly surrounds fiber optic cables 28. Gland 50 is operable to withstand internal pressure and prevents leakage of water from water hose 22 while providing access into and egress from cable leg 38 through orifices 52.

Each fiber optic communication cable 28 has an outside diameter greater in dimension that the inside diameter of orifice 52. Thus, when fiber optic communication cable 28 is extended into orifice 52, the gland 50 is radially compressed around fiber optic communication cable 28 to form a watertight seal. The fiber optic communication cables 28 extend through gland 50 and aperture 46 in end wall 44.

With this arrangement of fiber optic cables 28 extending into water hose 22, there is less likelihood of damage to the fiber optic communication cables 28 as they are protected within water hose 22. Water hose 22 preferably has an inside diameter of approximately 1.0 inch, and each fiber optic communication cable 28 preferably has an outside diameter of approximately 0.25 inches. Therefore, communication cable 28 does not substantially impede the flow of water through water hose 22.

Now referring to FIG. 2A, there is illustrated apparatus for permitting the fiber optic cable 28 to extend in length and move within the water hose 22 in response to stretching of the flexible hose 22 in the transmission of optical communication signals through the cable 28 positioned within the hose 22. The water hose 22 supplies water to the powered equipment, such as the mining machine 10 shown in FIG. 1, and is subjected to stretching when the equipment is moved. When the hose 22 is stretched it is placed in tension and subsequently the fiber optic cable 28 within the water hose 22 is also stretched. Because of the sensitive nature of the fiber optic cable 28, it can only withstand a limited degree of tension applied thereto when the water hose 22 is stretched.

In accordance with the present invention the fiber optic cable 28 is supported for movement within the water hose 22. The fiber optic cable 28 is capable of extending in length within the water hose in response to stretching of the water hose 22. As the water hose 22 is stretched, the cable 28 extends in length to relieve the increase in tension applied thereto. By supporting the cable 28 for movement within the hose 22, the cable 28 is substantially maintained under a preselected tension which preserves the sensitive construction of the cable 28. This assures that communication signals are supplied through the cable 28 to the electrically powered equipment on the mining machine 10 without interruption.

FIG. 2A illustrates one embodiment for permitting the fiber optic cable 28 to move within the water hose 22. The cable 28 includes a first end portion which enters the hose 22 through the insertion device 32 adjacent the control station 30 and exits the water hose 22 through the second insertion device 32 positioned onboard the mining machine 10 as shown in FIG. 1.

Between the points of entering the water hose 22 and exiting the water hose 22, the cable 28 includes an intermediate portion. FIG. 2A illustrates a section 55 of the intermediate portion of the cable 28 within the water hose 22. To permit the cable section 55 to move within the hose 22, the section 55 includes an elastic construction in the nature of the section 55 wound in a spiral configuration. The spiral configuration of the cable 28 is formed by a plurality of loops 57 that extend along a preselected length of the intermediate section 55 of the fiber optic cable 28. The spiral configuration may extend the complete distance between the fittings 32 or any preselected length therebetween. The loops 57 have a diameter that conform substantially to the inner diameter of the hose 22. The hose 22 has a preselected thickness formed by an outer wall 59 and an inner wall 61. The loops 57 are supported on the surface of the inner wall 61 and are movable thereon when the hose 22 is stretched.

In the configuration shown in FIG. 2A, the loops 57 are illustrated in an expanded state which corresponds to the normally maintained position of the cable 28 within the hose 22 when a preselected tension is maintained on the cable 28. In the event the hose 22 is stretched, the cable 28 is capable of moving to thereby release an increase in tension imparted to the cable 28. The tension in the cable 28 is released by a reduction in the diameter of the cable loops 57 as a result of movement of the cable within the hose.

In essence, the cable loops 57 provide an additional length of cable 28 within the hose 22 to accommodate stretching of the hose without adversely increasing the tension in the cable 28. When the hose 22 is relaxed or restored to its unstretched length, the cable 28 returns to the expanded configuration of the loops 57 shown in FIG. 2A. Overall when the water hose 22 is stretched, the stretching of the hose is uniform over its length and tension is uniformly applied to the cable 28 so that the cable 28 moves uniformly within the hose 22. To insure the uniform movement of the cable 28 within the hose 22 when the cable 22 is stretched, suitable means are provided for elastically securing the looped section 55 to the inner wall 61 of the hose 22.

Now referring to FIGS. 6 and 7, there is illustrated a cable spooling device generally designated by the numeral 63 for supporting the fiber optic cable 28 within the water hose 22 to allow for relief of tension applied to the cable 28 when the water hose 22 is stretched. Preferably, the cable spooling device 63 is positioned at the point where the cable insertion fitting 32 receives the cable 28 within the hose 22 adjacent to the control station 30. The insertion device 32, as above described, includes the water leg 34 for connection to a water hose (not shown in FIGS. 6 and 7), the merge leg 36, and the cable leg 38 for receiving the cable 28. Cable 28 is sealingly received and retained within the cable leg 38 by the gland retainer 40, as above described.

The merge leg 36 is connected to a water box 65 that is stationarily positioned adjacent the control station 30. The water box 65 includes an inlet 67 which is sealingly connected to the merge leg 36 of the fitting 32. The water box 65 includes an outlet 69 that is sealingly connected to the hose 22. With this arrangement, water under pressure is supplied through a hose to the water leg 34 of fitting 32 and is introduced into the water box 65 through the inlet 67. The water substantially fills the water box 65 and exits through the outlet 69 into the water hose 22. The water box 65 is a water sealed container.

The spooling device 63 is positioned within the water box 65 and supports the cable 28 in a manner to maintain a preselected tension on the cable so that when the hose 22 is stretched, the increase in tension that would be imparted to the cable 28 is released. This is accomplished without rotating the cable 28 on the spooling device 63. The spooling device 63 includes a stationary frame generally designated by the numeral 71 within the water box 65. The frame 71 is stationarily secured within the water box 65 and does not move relative to the cable 28.

In one embodiment, the stationary frame 71 includes a pair of plates 73 and 75 maintained fixed in spaced parallel position within in the water box 65 between the inlet 67 and the outlet 69. The plates 73 and 75, shown in FIGS. 6 and 7 may have any desired configuration to accommodate their positioning in the water box 65. For example, the plates may have a circular configuration suitable for the interior contour of the water box 65. The plates 73 and 75 are stationarily positioned. They do not move. Each plate includes a hub portion centrally positioned with respect to the plate. A shaft 79 extends through the oppositely positioned hubs 77 to connect the plates 73 and 75 and maintain the plates a preselected distance apart.

Each plate 73 and 75 includes a plurality of slots 81 that extend radially outwardly from the hub 77 around the shaft 79. The slots 81 have a preselected length as defined by opposite end portions 83 and 85 of each slot. A selected number of slots 81 are spaced an equal distance apart radially around the hub 77. For example, as shown in FIG. 6, eight slots are provided, but it should be understood that any number of radially extending, equally spaced apart slots may be utilized.

The slots 81 of the plates 73 and 75 are oppositely positioned to receive the end portions of shafts 87 of a plurality of rollers 89. The rollers 89 are elongated in configuration and extend substantially the entire width between the spaced apart plates 73 and 75. The rollers 89 are rotatable relative to the plates 73 and 75. Therefore, the rollers 89 do not contact the surfaces of the plates 73 and 75. The shafts 87 of the rollers 89 extend through the respective slots 81 so that end portions 91 of the shafts 87 extend outboard of the plates 73 and 75. The shafts 87 are rotatable with the rollers 89 without interference in the slots 81.

Mounted on the shaft end portion 91, outboard of each slot 81 is an actuator 93. The actuator 93 has a tubular construction with a closed end portion which rotatably receives the shaft end portion 91 and an elongated body portion 95 having a tubular construction with an open end for receiving a tube 97. The tube 97 is connected at one end portion to the hub 77 and extends perpendicular to the shaft end portion 91 a preselected length into the body portion 95 of actuator 93. Positioned within each tube 97 is a biasing device 99, such as a coil spring, that abuts at one end the hub 77 and at an opposite end the closed end portion of the actuator 93.

The biasing device 99 extends through the tube 97 and into the body portion 95 of the actuator 93. The body portion 95 of the actuator 93 is movable on the tube 97 so that the biasing device 99 exerts a force upon the actuator 93 to urge the actuator 93 to an outermost radial position within the slot 81 with respect to the cable 28 extending around the rollers 89. The extended position of the actuator 93 urges the rollers 89 to an outer radial position on the frame 71.

Preferably in the outer radial position, each roller 89 is maintained the same distance from the hub 77 and central shaft 79. When the biasing device 99 is compressed the actuator 93 moves radially inwardly toward the hub 77. With the biasing device 99 in a compressed state the rollers 89 are maintained in an inner radial position as shown in FIG. 7. It should be understood that while the spooling device 63 is utilized to store and feed fiber optic cable in accordance with the present invention, the spooling device 63 is also adaptable for use with any cable feeding application, such as electrical cable, where the use of swivels is not applicable so that the spooling device is not required to rotate, but the cable can be extended and retrieved.

The cable 28 is wrapped around the rollers 89 as it extends from the insertion device 32 into the water box 65. The cable 28 extends around the rollers 89, and the rollers support the cable 28. Preferably the cable 28 is wrapped in one revolution around the rollers 89 and extends through the outlet 69 of the water box 65 into the hose 22 which is suitably connected to the water box 65. When the water hose 22 is not stretched, the cable 28 is supported on the rollers 89 of the spooling device 63 with the rollers 89 in the outer radial position shown in FIG. 6. In this position, a preselected tension is maintained on the cable 28. In this position of the rollers 89, the cable forms an expanded loop around the rollers 89.

When tension is applied to the cable 28 upon stretching of the hose 22 the force exerted on the cable 28 compresses the biasing devices 99 so that the rollers 89 move inwardly by movement of the shaft end portions 91 in the radial slots 81. Depending upon the force exerted on the cable 28 the rollers 89 move toward the hub 77 to permit an additional length of the cable 28 to be fed from the spooling device into the hose 22. This is accomplished without rotation of the cable 28 on the spooling device 63. Consequently, swivel connections are not required at the points when the cable 28 feeds onto and off the spooling device 63. The rollers 89 move to an inner radial position corresponding to the position shown in FIG. 7.

In the inner radial position of the rollers 89 corresponding to an increased tension exerted on the cable 28, the size of the loop formed by the cable 28 decreases. The rollers 89 in their inner radial position support the cable 28 in a retracted loop, as shown in FIG. 7, around the rollers 89. In the retracted loop, tension in the cable is released because additional length of cable 28 is fed from the spooling device 63 into the hose 22.

When in operation, optical signals carry information from the fiber optic transmitter 30 to the mining machine 10 via one or more fiber optic communication cables 28 which are at least partially present in the stream of water supplied to the mining machine to perform a number of operations as discussed above. The primary system for remotely controlling operation of the continuous miner is a radio remote control system schematically illustrated in FIG. 4 and includes a radio transmitter generally designated by the numeral 54. The transmitter 54 is positioned remotely of the mining machine 10 similar to the remote positioning of the fiber optic transmitter 30, shown in FIG. 1, with respect to the machine 10.

Figure 4:
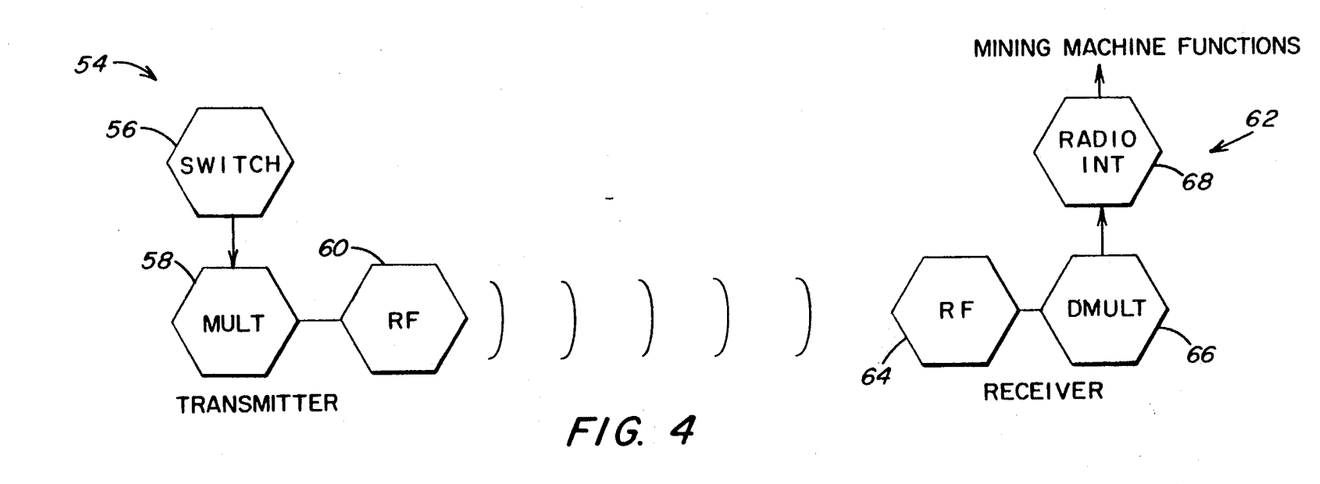
FIG. 4 is a schematic view of a primary radio remote control system for use with the present invention.

The radio transmitter 54 includes switches 56, a multiplexer 58, and a radio transmitter 60. The operator actuates the switches 56 to transmit a signal to the multiplexer 58 which, in turn, transmits one signal to radio transmitter 60. The radio transmitter 60 emits radio signals to a receiving unit generally designated by the numeral 62. The receiving unit 62 is positioned on the mining machine 10 and includes a radio receiver 64 and a demultiplexer 66. Radio receiver 64 receives the radio signal from transmitter 60 and transmits a responsive signal to demultiplexer 66 which, in turn, passes a demultiplexed signal to a radio interface 68. The radio interface is connected to electrical equipment on the mining machine 10 and generates a responsive signal to actuate operation of equipment on the mining machine.

The fiber optic remote control system 26 is shown in greater detail in FIG. 5 and operates as a parallel independent system to that of the radio system described above and illustrated in FIG. 4. The fiber optic system 26 is therefore a backup system for the radio remote control system in the operation of the functions performed by the mining machine. The fiber optic transmitter 30, as shown in FIG. 1, is positioned at a remote station and includes as shown in FIG. 5 switches 70, a multiplexer 72, and a fiber optic transmitter 74. When switches 70 are actuated, signals are sent to the multiplexer 72 which combine all the signals into one control signal which is sent to a transmitter 74. From transmitter 74 light impulses are sent through at least one fiber optic cable 28.

As described above and illustrated in FIGS. 1-3, the cable 28 enters water hose 22 through the insertion device 32. In the hose 22 the cable 28 is surrounded by the water flowing through the hose 22 to the miner. The fiber optic cable 28 then exits the water hose 22 through a second insertion device 32 onto the miner. The end of the cable 28 is connected to a fiber optic receiver 78 of a receiver unit 76 mounted on the miner. The light impulses from cable 28 are converted by the receiver 78 to electrical signals which are decoded by a demultiplexer 80. The demultiplexed signs are sent to a radio interface 82 which is connected to the electrical powered equipment on the miner. Response signals from interface 82 actuate operation of the selected equipment on the miner.

The present invention is not limited to use with a redundant remote control system which is just one example of how the present invention may be utilized. The present invention may be utilized with any fiber optic remote control system for electrically powered equipment having a water hose to supply water thereto.

According to the provisions of the patent statutes, I have explained the principle, preferred construction and mode of operation of my invention and have illustrated and described what I now consider to represent its best embodiment. However, it should be understood that, within the scope of the appended claims, the invention may be practiced otherwise than as specifically illustrated and described.

I claim:

1. Apparatus for transmitting optical communication signals to electrically powered equipment used in an underground mine comprising, at least one optical communication cable having a first end portion, a second end portion, and an intermediate portion between said first and second end portions, said cable first end portion positioned remotely from the powered equipment for receiving optical communication signals, said cable second end portion positioned to supply the optical communication signals onboard the powered equipment, a flexible hose for conveying a fluid from a source to the powered equipment, means for connecting said hose to the powered equipment for movement of said hose with the powered equipment while supplying fluid onboard the powered equipment, said cable extending a preselected length through said hose with fluid flowing through said hose surrounding said cable, said cable entering said hose at a point adjacent said first end portion and exiting said hose at a point adjacent said second end portion with said intermediate portion positioned within said hose, and means for relieving tension on said cable intermediate portion to permit said cable to extend in length and move within said hose in response to stretching of said flexible hose in the transmission of optical communication signals through said cable positioned within said hose supplying a fluid to the powered equipment.

2. Apparatus as set forth in claim 1 in which, said means for relieving tension on said cable to permit said cable to extend in length and move within said hose includes said cable intermediate portion having elastic means for allowing expansion of said cable intermediate portion within said hose from a first length to a second length greater than the first length.

3. Apparatus as set forth in claim 2 in which, said elastic means includes said cable intermediate portion having a section wound in a spiral configuration, and said section being expanded in length in response to stretching along the length of said flexible hose.

4. Apparatus as set forth in claim 3 which includes, said flexible hose having an inner surface, and means for elastically securing said cable intermediate portion to said flexible hose inner surface.

5. Apparatus as set forth in claim 1 which includes, transmitter means positioned remotely of the mining machine for generating optical communication signals to the mining machine, and receiver means positioned on the mining machine and connected to said cable second end portion for receiving the optical communication signals and converting the signals to electrical signals onboard the mining machine.

6. Apparatus as set forth in claim 1 which includes, a fitting for sealingly connecting said cable to said hose at the points where said cable enters and exits said hose, said fitting having a body portion, said body portion having a fluid leg, a cable leg and a merge leg, said fluid leg being aligned with said merge leg to form a hose passage for said hose to extend through said fluid leg and said merge leg, said cable leg extending from said fluid leg and said merge leg, said cable leg including a cable passage communicating with said hose passage, said cable selectively entering and exiting said cable passage and extending into said hose to travel through said hose, and seal means for sealing said cable passage around said cable to prevent the escape of fluid out of said cable leg.

7. Apparatus as set forth in claim 6 wherein, said fitting cable leg has one end connected to said fluid leg and said merge leg and an opposite open end, and said seal means closing said open end to prevent the escape of fluid therefrom while permitting said cable to extend through said seal means into and out of said cable leg.

8. Apparatus as set forth in claim 7 in which, said seal means includes a gland positioned in said cable leg open end, a gland retainer connected to said cable leg and sealingly positioned around said gland to support said gland in said cable leg open end, and said gland having at least one orifice with means for permitting said cable to pass through said orifice without fluid escaping through said orifice.

9. Apparatus as set forth in claim 8 which includes, said gland being fabricated of a resilient material, and each said orifice having a diameter less than the outer diameter of said cable such that said gland expands around said orifice when said cable is inserted through said orifice and said gland radially compresses said cable to form a fluidtight seal around said cable.

10. Apparatus as set forth in claim 8 which includes, means for threadedly connecting said gland retainer to said cable leg to compress said gland into surrounding relation with said cable passing through said orifice to form a fluidtight seal around said cable.

11. A mining machine comprising, a mobile frame, means connected to said mobile frame for dislodging mine material, conveying means for moving the dislodged mine material rearwardly of said mining machine, a water hose to supply said mining machine with water, an operating station located remote of said mobile frame, a fiber optic control system positioned at said operating station, a fiber optical cable for transmitting optical communication signals from said control system onboard said mining machine, said fiber optic cable having a first end portion connected to said control system and a second end portion positioned onboard said mining machine, said fiber optic cable extending through said water hose, between said first and second end portions, a stationary frame with a plurality of rollers rotatably supported in a circular array on said frame for storing a preselected length of said fiber optic cable adjacent to said cable first end portion, means for rotatably supporting said rollers for movement in a radial direction between an inner radial position on said frame to an outer radial position on said frame, biasing means supported by said frame for normally urging said roller to move to the outer radial position to support said cable in an expanded loop around said rollers, and said biasing means responding to an increase in tension exerted on said cable to move said rollers to the inner radial position to support said cable in a retracted loop around said rollers to permit feeding an additional length of said cable into said water hose to relieve tension exerted on said cable when said water hose is stretched.

12. A mining machine as set forth in claim 11 which includes, connecting means for introducing said cable in said water hose and exiting said cable from said water hose.

13. A mining machine as set forth in claim 12 which includes, said connecting means includes a y-shaped connector, and said connector having an inlet end sealingly connected to said water hose, an outlet end sealingly connected to said water hose, and an opening between said inlet end and said outlet end for receiving said cable in said water hose.

14. A mining machine as set forth in claim 11 in which, said rollers in the outer radial position support a single wrap of said cable in the expanded loop having a preselected tension thereon, and said rollers move from the outer radial position to the inner radial position to support said cable in the retracted loop to feed a length of cable from the single wrap when the tension on said cable is increased to thereby maintain a preselected tension on said cable.

15. A method for transmitting optical communication signals to a mining machine comprising the steps of, connecting a hose to a mining machine for movement with the mining machine in conducting mining operations, supplying water to the mining machine through the hose from a source positioned remote from the mining machine for performing work on the mining machine, generating optical communication signals from a station located remote from the operation of the mining machine, inserting the fiber optic cable into the water hose adjacent to the station, extending the fiber optic cable a preselected distance through the water hose, exiting the fiber optic cable from the water hose for connection to the mining machine, and supporting the fiber optic cable to extend and retract the length of the cable in the hose to relieve tension exerted on the fiber optic cable when the water hose is stretched.

16. A method as set forth in claim 15 which includes, attaching a connector to the water hose at a point thereon where the fiber optic cable enters and exits the water hose, extending the fiber optic cable through the connector into the water hose, and forming a watertight seal around the fiber optic cable in the connector to permit the fiber optic cable to pass through the connector while preventing the escape of water from the hose through the connector.

17. A method as set forth in claim 16 which includes, positioning a flexible gland in an opening for receiving the fiber optic cable, extending the fiber optic cable through an aperture in the gland, and maintaining the gland around the aperture in compression with the fiber optic cable.

18. A method as set forth in claim 17 which includes, compressing the gland in sealing engagement with the fiber optic cable to prevent water from escaping from the connector around the fiber optic cable.

19. A cable spooling device comprising, a stationary frame, a plurality of rollers positioned in spaced relation in a circular array adjacent to said frame, said rollers having surfaces for supporting a length of cable looped between ends of the cable around said rollers in a loop, said rollers each having opposite end portions and a shaft extending from said end portions, slot means in said frame for receiving the end portions of said shafts of said rollers, said slot means extending in a radial direction on said frame to guide said rollers between an inner radial position and an outer radial position, biasing means supported by said frame in abutting relation with said roller shafts for normally urging said roller shafts to move in said slot means to the outer radial position on said frame to support the cable in an expanded loop around said rollers, and said biasing means responding to an increase in tension exerted on the cable to allow said roller shafts to move in said slot means to the inner radial position on said frame to support the cable in a retracted loop around said rollers to decrease the tension in the cable.

20. A cable spooling device as set forth in claim 19 in which, said biasing means is positioned on said frame in alignment with said slot means, said biasing means in an expanded position applying a force upon said roller shafts to position said rollers in the outer radial position for supporting the cable in the expanded loop around said rollers, and said biasing means responding to an increase in tension on the cable to move from the expanded position to a retracted position and position said rollers in the inner radial position for supporting the cable in the retracted loop around said rollers.

21. A cable spooling device as set forth in claim 19 in which, said slot means include a plurality of radial slots extending from a central point on said frame in a radial pattern thereon, said end portions of said roller shafts being positioned in said radial slots respectively, and said roller shafts being movable along the length of said slots between the outer and inner radial positions to adjust the position of said rollers for supporting the cable in the expanded and retracted loop respectively.

22. A cable spooling device as set forth in claim 19 in which, said biasing means include a plurality of springs positioned in alignment with said slot means respectively, said springs each having opposite end portions acting on said frame and said roller shafts to exert an outward compressive force on said roller shafts to normally maintain said rollers in the outer radial position to support the cable in the expanded loop, and said springs being compressed in response to an increase in tension exerted on the cable and move said roller shafts in said slot means so that said rollers are in the inner radial position to support the cable in the retracted loop for reducing the tension on the cable.

23. A cable spooling device as set forth in claim 19 in which, said rollers in the outer radial position support a single wrap of the cable in the expanded loop having a preselected tension thereon, and said rollers move from the outer radial position to the inner radial position to support the cable in the retracted loop to feed a length of cable from the single wrap when the tension on the cable is increased to thereby maintain a preselected tension on the cable.

24. A cable spooling device as set forth in claim 19 which includes, a plurality of actuators connected to roller shaft end portions respectively, said biasing means being compressed between said frame and said actuators to exert a force on said actuators to normally maintain said rollers in the outer radial position for supporting a single wrap of the cable in the expanded loop, and said biasing means in response to an increase in tension on the single wrap of cable move said actuators to position the rollers in the inner radial position for supporting the cable in the retracted loop and reduce the tension in the cable.

25. A mining machine comprising, a mobile frame, means connected to said mobile frame for dislodging mine material, conveying means for moving the dislodged mine material rearwardly of said mining machine, a flexible cable extending from one end portion located remote of said mining machine to a connection on said mining machine, a stationary frame positioned remote of said mining machine and including a plurality of rollers rotatably supported in a circular array on said frame for storing a preselected length of said cable to be fed to said mining machine, means for rotatably supporting said rollers for movement in a radial direction between an inner radial position on said frame to an outer radial position on said frame, biasing means supported by said frame for normally urging said rollers to move to the outer radial position to support said cable in an expanded loop around said rollers, and said biasing means responding to an increase in tension exerted on said cable to move said rollers to the inner radial position to support said cable in a retracted loop around said rollers to permit feeding an additional length of said cable to said mining machine to decrease the tension in said cable when said cable is stretched.

* * * * *